US007604017B2

(12) United States Patent
O'Hara

(10) Patent No.: US 7,604,017 B2
(45) Date of Patent: Oct. 20, 2009

(54) WATER INGRESS DETECTION SYSTEM

(76) Inventor: Leonard O'Hara, 15 Reid Crescent, Milnathort, Kinross (GB) KY13 3TB ( * ) Notice: Subject to any disclaimer, the term of this patent is extended or adjusted under 35 U.S.C. 154(b) by 587 days.

(21) Appl. No.: 10/596,020

(22) PCT Filed: Dec. 3, 2003

(86) PCT No.: PCT/GB03/05216

§ 371 (c)(1), (2), (4) Date: May 25, 2006

(87) PCT Pub. No.: WO2005/054743

PCT Pub. Date: Jun. 15, 2005

(65) Prior Publication Data

US 2007/0151605 A1 Jul. 5, 2007

(51) Int. Cl.
*F16K 31/18* (2006.01)

(52) U.S. Cl. .......................... 137/1; 137/312; 137/554; 137/558; 137/559; 137/409; 73/40.5 R

(58) Field of Classification Search ................. 137/312, 137/551, 552, 554, 558, 409, 1, 559; 73/40.5 R
See application file for complete search history.

(56) References Cited

U.S. PATENT DOCUMENTS 3,410,313 A 11/1968 Martin
3,428,074 A * 2/1969 Perren ........................ 137/312
3,547,301 A 12/1970 FFooks
4,079,689 A 3/1978 Llorente
4,288,654 A 9/1981 Blom et al.
4,973,946 A * 11/1990 Cowden, II .................. 73/49.2

FOREIGN PATENT DOCUMENTS

FR 2710310 A 3/1995
GB 1311472 A 3/1973

* cited by examiner

*Primary Examiner*—Kevin L Lee
(74) *Attorney, Agent, or Firm*—David A. Guerra

(57) ABSTRACT

The present invention provides a water ingress detection system (1) suitable for use in indicating the ingress of water (12) onto a pipe (2) or vessel inside a casing (3), from outside. The system (1) comprises a deflector (4) secured to the underside (7) of the pipe (2) inside the casing (3) provided thereon, a conduit (8) coupled to the deflector (4) for leading water (12) away from the pipe (2) to a water-sensing indicator device (13). The indicator device (13) has a signal output portion (17) disposed externally of the casing (3) for signalling the presence of water (11). The deflector (4) is formed and arranged for intercepting water (12) running along the exterior (7) of the pipe (2) inside the casing (3) and diverting it into the conduit (8), and the conduit (8) and water-sensing indicator device (13) are formed and arranged so that the indicator device (13) can sense substantially only water (12) intercepted by the deflector (4). In further respects the present invention provides a pipe or vessel provided with a detection system of the invention, and a method of warning of the ingress of water onto a pipe or vessel inside a casing from outside said casing, using a detection system of the invention.

19 Claims, 2 Drawing Sheets

WATER INGRESS DETECTION SYSTEM

CROSS-REFERENCE TO RELATED APPLICATIONS

This application is an U.S. national phase application under 35 U.S.C. §371 based upon co-pending International Application No. PCT/GB2003/005216 filed Dec. 3, 2003. Additionally, this U.S. national phase application claims the benefit of priority of co-pending International Application No. PCT/GB2003/005216 filed Dec. 3, 2003. The entire disclosure of the prior application is incorporated herein by reference. The international application was published Jun. 16, 2005 under Publication No. WO 2005/054743 A1.

STATEMENT REGARDING FEDERALLY SPONSERED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to a water ingress detection system suitable for use in indicating the presence of water under insulation on pipework and vessels as a result of ingress from the outside.

2. Description of Related Art

Installations such as oil refineries, chemical manufacturing plant etc, often have large amounts of insulated pipework and vessels which are exposed to the elements. Over a period of time the insulation casing may deteriorate and/or suffer physical damage which can allow rainwater etc to penetrate the casing and wet the pipework or vessels. This can lead to corrosion if not detected early enough and in certain industries this can be extremely hazardous. This means that companies and resources have to be put in place to inspect insulated pipework and vessels regularly to confirm it is free of corrosion, or replace pipework or vessels which have been corroded. It is an object of the present invention to avoid or minimise one or more of the above disadvantages.

It has now been found that the presence of water under insulation may be detected and indicated in a simple, reliable and economic manner, by visual means, with an indicator comprising a deflector plate, which is flush with the bottom of the pipe or vessel and inside the insulation, which channels the water down a collector tube to an indication chamber which is outside the insulation. The indication may either be a mechanical indication or electronic indication or both together.

BRIEF SUMMARY OF THE INVENTION

Thus in one aspect the present invention provides a water ingress detection system suitable for use in indicating the ingress of water onto a pipe or vessel inside a casing, from outside said casing, which system comprises a deflector formed and arranged for securing in use, conveniently by using a tie wrap or other means of banding, to the underside of a pipe or vessel inside a casing provided thereon, a conduit coupled to said deflector for leading water away from said pipe or vessel to a water-sensing indicator device, said indicator device having at least a signal output portion disposed externally of said casing for signalling the presence of water, said deflector being formed and arranged for intercepting water running along the exterior of the pipe or vessel inside the casing and diverting said water into said conduit, and said conduit and water-sensing indicator device being formed and arranged so that said water-sensing indicator device can sense substantially only water intercepted by said deflector.

Conveniently the deflector comprises at least one, at least part-annularly extending, flange element, preferably two spaced apart said flange elements with a saddle portion extending therebetween to facilitate fixing-conveniently by means of an annular tie device disposable around said pipe or vessel and across said saddle portion for securing the deflector to said pipe or vessel.

Such an arrangement facilitates quick and economic monitoring and removal and/or relocation of the deflector. Nevertheless, various other forms of deflector and fixing thereof to pipes or vessels, may be employed. Thus in general the deflector comprises a base portion securable against the outer surface of the pipe, in use of the system, and an upstanding deflector member which projects generally radially outwardly from the pipe when the base portion is seated against it. The base portion may be secured to the pipe or vessel in any convenient manner including, for example, adhesively. Most conveniently though the deflector is secured by a tie fastener which is disposed around the base portion and pipe or vessel, so as to tie the deflector down onto the pipe or vessel. Desirably the deflector is formed and arranged for a more or less positive interengagement with the tie device for greater security. Thus, for example, there may be used a saddle portion between a pair of opposed deflector members as described herein above, or an aperture through a deflector member, through which, part of a tie device may be threaded.

Either or both of the conduit, and the water-sensing indicator device, components of the system could be secured to the insulated pipe or vessel, independently of the deflector, for example, by means of separate tie devices secured to the pipe, or by being supported by the insulation casing. Desirably though the conduit and water-sensing indicator device, are secured to the detector, so as to support them, whilst providing the desired water flow routing into the indicator device. It will of course be understood that the outwardly extending part of the deflector itself functions as a conduit, and the scope of the present invention is not restricted to any particular form or type, or extent, of conduit.

As also noted herein, an important feature of the system of the invention is the substantial prevention of water from outside the casing entering directly into the indicator device, and the conduit leading thereinto (to avoid false alarms), and for this reason the conduit inlet is generally located within the casing so as to be screened thereby from the casing exterior. On the other hand care should be taken to ensure that the casing should not completely seal the opening, but should allow more or less free passage along the deflector into the conduit opening.

In a particularly simple and convenient form of the invention, the indicator device comprises a water receiving chamber containing a float movable between lower and upper positions according to the water level inside said chamber. If desired though such a float may additionally be used to drive a mechanical signalling device e.g. pivotally mounted signal arm, and/or an electrical switch device which may be used to actuate an electrical signalling device such as an audio and/or visual signalling device. Alternatively instead of using a float there could be used an electronic water sensing device, e.g. a resistance device whose resistance is reduced when contacted with water, and which is coupled to an electronic circuit for detecting such a resistance change and activating an electrical signalling device in response thereto.

The detection systems of the invention are conveniently installed at suitable intervals along a pipe run, typically from 0.5 to 10 meters, preferably from 1 to 5 meters, conveniently about 2 meters, so that any significant water ingress would run down and along the bottom of the pipe and would reach the system where it would be deflected into the indicator device activating it, and thereby giving indication of any water present under the insulation. It will be appreciated that in general the closer the spacing of the systems, then the narrower the area covered by a given system and hence the smaller the area of casing requiring detailed inspection. This, however, needs to be balanced against the cost of the individual systems. The mechanical float indicator device would stay in the alarm position until physically removed by unscrewing the chamber and the water captured therein, emptied out. The electronic units would be capable of continuous indication for up to 1 week until the battery life runs out.

In cases where a particular section of the pipework is not readily accessible for easy direct visual inspection, there may conveniently be incorporated any convenient form of remote signalling system including audio and/or visual systems such as alarm tones, flashing lights, radio signals etc, using if desired remote signal output devices connected by suitable wiring or tirelessly to the pipe mounted indicator device.

Thus, for example, there could be used a signalling device with high intensity LED's powered by battery, and which can flash on and off for up to 1 week or more.

In another aspect the present invention provides A pipe or vessel provided with a casing, wherein is provided a water ingress detection system according to the present invention.

In a further aspect the present invention provides a method of warning of the ingress of water onto a pipe or vessel inside a casing from outside said casing, which method comprises the steps of: a) providing a detection system according to the present invention; and b) securing the deflector to the underside of the pipe or vessel, and the conduit and indicator device under the deflector for receiving water deflected thereby from the underside of the pipe or vessel, with the indicator device in a primed condition for activation by the entry of a predetermined level of water to the indicator device.

BRIEF DESCRIPTION OF THE DRAWINGS

Further preferred features and advantages of the invention will appear from the following detailed description given by way of example of a preferred embodiment illustrated with reference to the accompanying drawings in which.

DETAILED DESCRIPTION OF THE INVENTION

Figure 1:
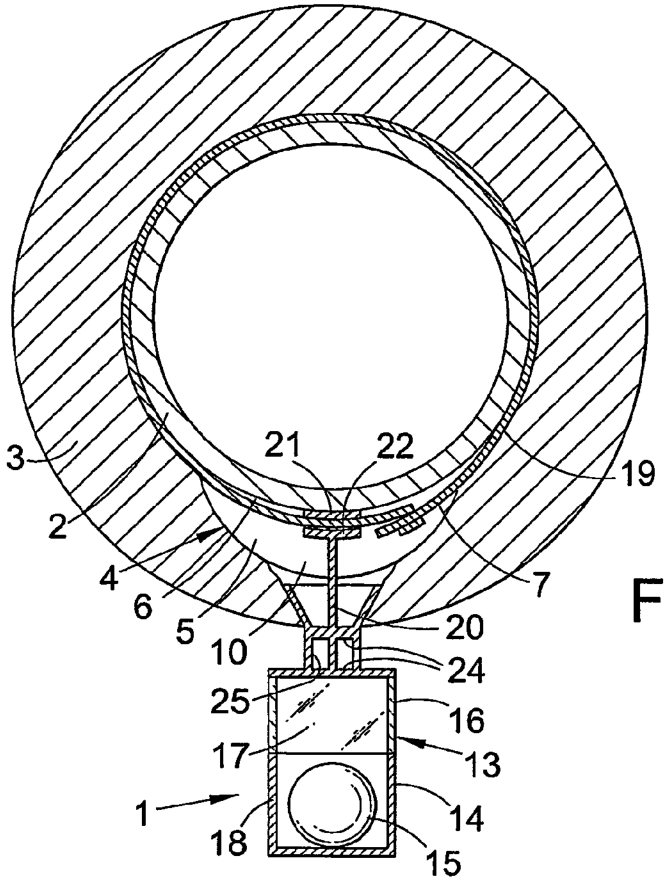
FIG. 1 is a transverse cross-section through a water ingress detection system of the invention mounted on an insulated pipe, in an initial un-triggered condition.

Referring to the drawings there is shown a detection system 1 mounted on a pipe 2 provided with an insulating casing 3.

In more detail, the system 1 comprises a deflector 4 comprising a pair of spaced apart crescent form deflector plates 5 either side of a saddle 6, and mounted against the underside 7 of the pipe 2 inside the insulation casing 3. A downwardly extending conduit 8 has an enlarged diameter funnel-shaped mouth portion 9 disposed centrally 10 under the deflector 4 for catching water 11 intercepted by the deflector plates 5 and running down them, as indicated by the arrows 12. The conduit 8 leads the water down away from the pipe and deflector 4, to a water sensing indicator device 13.

The indicator device 13 comprises a cylindrical chamber 14 containing a ball float 15. The upper part 16 of the chamber 14 has a translucent wall providing a window 17 through which the brightly fluorescent-coloured ball 15 can be observed when it is in its upper position (see FIG. 2). The lower part 18 of the chamber 14 is of metal or other opaque material so that the ball 15 is not visible when it is in lowered position as shown in FIG. 1.

As may be seen from the drawings the chamber 14 is disposed below the insulation casing 3 so that a signal output portion of the indicator device 13 constituted by the window 17 is disposed outside the casing 3.

The deflector 4 is secured to the pipe 1 by means of an annular tie device 19 (such as a jubilee clip or polyamide or other like plastics material ratchet tie or band-it strapping), which is tightened around the deflector saddle 6 and the pipe 1.

The indicator device 13 and conduit 8 are also supported from the tie device 19. In more detail, a support leg 20 has a base portion 21 with a slot 22 extending therethrough, and through which the tie device 19 can be threaded to clamp the base portion 21 against the pipe under surface 7. The distal end 23 of the leg has radially extending arms 24 which are connected to the inside wall 25 of the conduit 8.

In use of the device 1, if a crack C forms in the casing 3, external water W can penetrate the casing 3 and once it reaches the pipe 2, it tends to run along the underside 7 thereof in the direction of the fall of the pipe until it reaches the deflector 4 whereupon it runs down a deflector plate 5 into the conduit 8, and hence into the chamber 14. As the level L of the water 11 in the chamber 14 builds up, the float is progressively raised, becoming increasingly visible through the window 17 of the chamber 14. Thus by a simple visual inspection of the indicator device it can be readily seen if there has been any water ingress onto the pipe where it could give rise to corrosion. It will be appreciated furthermore, that the location of the mouth of the conduit inside the casing 3, the possibility of false alarms being generated due to external water which has not penetrated the casing 3 onto the pipe 2, is unlikely.

Figure 2:
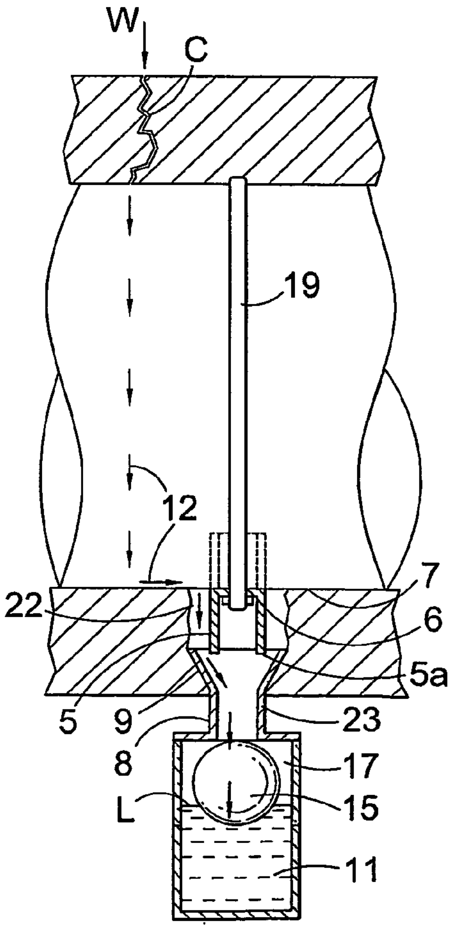
FIG. 2 is a longitudinal section (with respect to the pipe so as to reveal the pipe) of a modified system closely similar to that of FIG. 1, in an alarm condition.

In the modified system of FIG. 2, the indicator device 13 and conduit 8 are supported directly from the deflector plates 5—the conduit mouth portion 9 being formed integrally with the bottom edges 5*a* of the deflector plates 5, without the need for a support leg.

It will be appreciated that, insofar as the system of the present invention provides early warning of any water ingress, it will usually be possible to make a detailed inspection of the casing in the vicinity of the system found in an alarm condition and locate and seal or otherwise repair any damage to the casing before any corrosion has taken place, thereby often avoiding the need for removal of all the casing for inspection. The facility to replace the indication chamber after years of passive use without removal of the insulation or casing is an added benefit.

Figure 3:
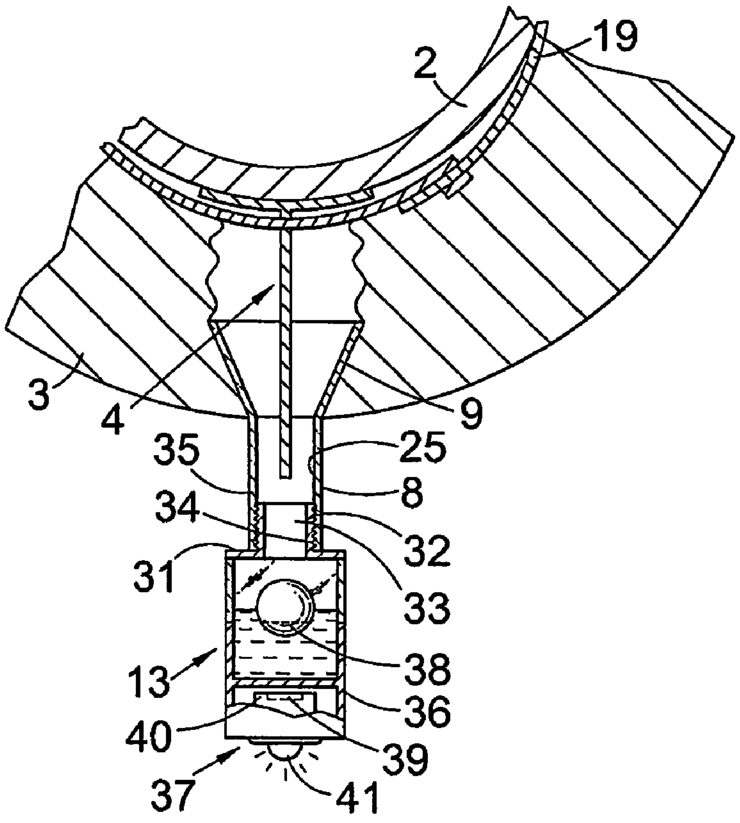
FIG. 3 is a transverse section view corresponding substantially to FIG. 1 of a further embodiment.
Figure 4:
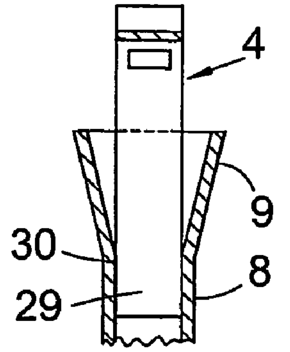
FIG. 4 is a detail longitudinal section view corresponding to that of FIG. 2, showing the deflector and part of the conduit of the embodiment of FIG. 3.

FIGS. 3 and 4 show another embodiment in which like parts corresponding to those shown in FIGS. 1 and 2, are indicated by like reference numbers. In this case the deflector 4 has a generally strip-form leg 26 connected to a strip-form base 27 and having a slot 28 in close proximity to the base 27, and through which the tie device 19 can be threaded so as to clamp the base 27 to the pipe 2. The distal end portion 29 of the leg 26 has outer side edges 30 formed integrally with the inner side wall 25 of the conduit 8 (or otherwise secured thereto e.g. by a friction fit, adhesively, or fusing thereto), thereby supporting the conduit 8 and in turn, the indicator device 13, from the pipe 2.

In this case the upper end 31 of the indicator device 13 has an externally screwthreaded 32 neck portion 33, which is secured into an internally threaded 34 distal end portion 35 of the conduit 8. This facilitates disconnection of the indicator device 13 when required to empty water therefrom, without the need for disturbing the casing 3.

The lower end 36 of the indicator device 13 below the chamber 14, houses an additional electronic signalling device 37. In more detail a magnet 38 disposed inside the float 15 is used to open and close a magnet proximity switch 39 (such as a read switch), incorporated in a signalling circuit 40 so that when the float is raised sufficiently far away from the switch 39, a high intensity LED 41 is illuminated (preferably in a flashing mode).

It will be appreciated that the various parts of the system can be made from various materials. Most conveniently through the deflector, conduit and indicator device (as least the chamber thereof) are made of plastics material, preferably as moulded plastic components.

It will of course be appreciated that the detection system of the present invention can warn, not only of water ingress from outside the casing but also of significant quantities of water appearing on the pipe or vessel surface-thereby giving rise to the risk of corrosion, from any source, including water leaking out of the encased pipes or vessels. It will moreover be understood that different types and/or configurations of indicator device, will require different (predetermined) amounts of water to switch the device from a "primed" condition to an "alarm" condition in which a warning signal is generated. Thus, for example, in the above-described example, a certain amount of water will be required to raise the float through a given height in which it is substantially visible through the window, depending on the size and buoyancy of the float, the diameter of the chamber etc.

The invention claimed is:

1. A water ingress detection system suitable for use in indicating the ingress of water onto a pipe or vessel inside a casing, from outside said casing, said water ingress detection system comprising:

at least one deflector securable to the underside of said vessel inside said casing;

a tie device adapted to be clamped against said vessel, and be engagable to a base portion of said deflector;

at least one conduit coupled to said deflector for leading water away from said vessel; and at least one water-sensing indicator device attachable to said conduit and adapted to receive water from said conduit, said water-sensing indicator device having at least one signal output portion disposed externally of said casing for signaling the presence of water;

wherein said deflector being formed and arranged for intercepting water running along the exterior of said vessel inside said casing and diverting said water into said conduit;

wherein said conduit and water-sensing indicator device being formed and arranged so that said water-sensing indicator device can sense substantially only water intercepted by said deflector.

2. The water ingress detection system as set forth in claim 1, wherein said deflector is at least one, at least part-annularly extending, flange element upstanding from said base portion of said deflector.

3. The water ingress detection system as set forth in claim 2, wherein said deflector comprises two spaced apart said flange elements, with a saddle portion extending therebetween.

4. The water ingress detection system as set forth in claim 1, wherein said conduit and said water-sensing indicator device is secured to said vessel by a support leg having said base portion engagable by said tie device, said tie device adapted to be clamped against said vessel.

5. The water ingress detection system as set forth in claim 1, wherein said deflector has an elongate strip portion upstanding from said base portion and having a distal end portion secured to said conduit and said indicator device, so as to support said conduit and indicator device from said vessel.

6. The water ingress detection system as set forth in claim 1, wherein said conduit has an enlarged diameter mouth portion for receiving water deflected from said vessel by said deflector.

7. The water ingress detection system as set forth in claim 1, wherein said indicator device comprises a water receiving chamber containing a float movable between lower and upper positions according to the water level inside said chamber.

8. The water ingress detection system as set forth in claim 7, wherein said chamber has at least one window portion adjacent said upper position through which the dispositions of said float in a said upper position may be visually detected.

9. The water ingress detection system as set forth in claim 7, wherein said indicator device includes a mechanical signaling device actuatable by movement of said float from its lower position to its upper position.

10. The water ingress detection system as set forth in claim 7, wherein said indictor device includes an electrical switch device actuatable by movement of said float from its lower position to its upper position, and coupled to an electronic signaling device.

11. The water ingress detection system as set forth in claim 10, wherein said electronic signaling device is selected from the group consisting of an audio, radio signal, and visual signaling device.

12. A water ingress detection system comprising:

at least one deflector securable to the underside of a pipe positioned inside a casing, said deflector having a base portion, a slot defined through said base portion, and a pair of spaced apart crescent form deflector plates positioned on either side of a saddle, and mounted against the underside of said pipe inside said casing a tie device adapted to be positioned through said slot of said deflector and clamped against said pipe;

at least one conduit coupled to said deflector for leading water away from said pipe, said conduit having an enlarged diameter mouth portion adapted to receive water deflected from said deflector; and at least one water-sensing indicator device attachable to said conduit and adapted to receive water from said conduit, said water-sensing indicator device having at least one signal output portion disposed externally of said casing for signaling the presence of water, and a water receiving chamber containing a float movable between lower and upper positions according to the water level in said chamber;

wherein said deflector being formed and arranged for intercepting water running along the exterior of said pipe inside said casing and diverting said water into said conduit;

wherein said conduit and water-sensing indicator device being formed and arranged so that said water-sensing indicator device can sense substantially only water intercepted by said deflector.

13. The water ingress detection system as set forth in claim 12, wherein said water receiving chamber of said indicator device has at least one window portion adjacent said upper position through which the dispositions of said float in a said upper position may be visually detected.

14. The water ingress detection system as set forth in claim 12, wherein said indicator device includes a mechanical signaling device actuatable by movement of said float from its lower position to its upper position.

15. The water ingress detection system as set forth in claim 12, wherein said indictor device includes an electrical switch device actuatable by movement of said float from its lower position to its upper position, and coupled to an electronic signaling device, and wherein said electronic signaling device is selected from the group consisting of an audio, radio signal, and visual signaling device.

16. The water ingress detection system as set forth in claim 15, further comprising a magnet disposed inside said float, said magnet being adapted to open and close a magnet proximity switch incorporated in a signaling circuit in said electrical switch device, so that when said float is raised sufficiently far away from said proximity switch, a high intensity LED is illuminated.

17. The water ingress detection system as set forth in claim 12, wherein said deflector further comprising a generally strip-form leg connected to said base portion, a distal end portion of said leg has outer side edges formed integrally with an inner side wall of said conduit, thereby supporting said conduit from said pipe.

18. The water ingress detection system as set forth in claim 17, wherein an upper end of said indicator device has an externally threaded neck portion, which is secured into an internally threaded distal end portion of said conduit.

19. A method of warning of the ingress of water onto a pipe positioned inside a casing from outside said casing, said method comprising the steps of:

(a) providing a water ingress detection system comprising: at least one deflector securable to the underside of said pipe; at least one conduit coupled to said deflector for leading water away from said pipe; and at least one water-sensing indicator device attachable to said conduit and adapted to receive water from said conduit, said water-sensing indicator device having at least one signal output portion disposed externally of said casing for signaling the presence of water, and a float movable between lower and upper positions according to the water level in said indicator device; wherein said deflector being formed and arranged for intercepting water running along the exterior of said pipe inside said casing and diverting said water into said conduit; wherein said conduit and water-sensing indicator device being formed and arranged so that said water-sensing indicator device can sense substantially only water intercepted by said deflector;

(b) securing said deflector to the underside of said pipe and to said conduit;

(c) positioning said conduit being below said deflector so as to receive water from said deflector;

(d) deflecting the water from said underside of said pipe by said deflector;

(e) transferring the water through said conduit;

(g) receiving the water in said water-sensing indicator device from said conduit;

(h) moving said float between lower and upper positions according to the water level in said indicator device; and (i) signaling the presence of water in said indicator to a position external of said casing via said float.

* * * * *